(12) United States Patent
Cooke et al.

(10) Patent No.: US 7,417,744 B2
(45) Date of Patent: Aug. 26, 2008

(54) COHERENT HYBRID ELECTROMAGNETIC FIELD IMAGING

(75) Inventors: Bradly J. Cooke, Jemez Springs, NM (US); David C. Guenther, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 135 days.

(21) Appl. No.: 11/363,890

(22) Filed: Feb. 27, 2006

(65) Prior Publication Data

US 2007/0201036 A1  Aug. 30, 2007

(51) Int. Cl.
*G01B 11/02* (2006.01)

(52) U.S. Cl. ..................................... 356/512

(58) Field of Classification Search ................. 356/451, 356/456, 484, 485, 486, 487, 512
See application file for complete search history.

(56) References Cited

U.S. PATENT DOCUMENTS

| | | | |
|---|---|---|---|
| 5,493,395 A * | 2/1996 | Otsuka | 356/487 |
| 5,875,030 A | 2/1999 | Cooke et al. | |
| 5,943,132 A * | 8/1999 | Erskine | 356/484 |
| 6,724,485 B1 * | 4/2004 | Drabarek | 356/485 |

* cited by examiner

*Primary Examiner*—Michael A Lyons
(74) *Attorney, Agent, or Firm*—Mark N. Fitzgerald; Samuel L. Borkowsky

(57) ABSTRACT

An apparatus and corresponding method for coherent hybrid electromagnetic field imaging of a target, where an energy source is used to generate a propagating electromagnetic beam, an electromagnetic beam splitting means to split the beam into two or more coherently matched beams of about equal amplitude, and where the spatial and temporal self-coherence between each two or more coherently matched beams is preserved. Two or more differential modulation means are employed to modulate each two or more coherently matched beams with a time-varying polarization, frequency, phase, and amplitude signal. An electromagnetic beam combining means is used to coherently combine said two or more coherently matched beams into a coherent electromagnetic beam. One or more electromagnetic beam controlling means are used for collimating, guiding, or focusing the coherent electromagnetic beam. One or more apertures are used for transmitting and receiving the coherent electromagnetic beam to and from the target. A receiver is used that is capable of square-law detection of the coherent electromagnetic beam. A waveform generator is used that is capable of generation and control of time-varying polarization, frequency, phase, or amplitude modulation waveforms and sequences. A means of synchronizing time varying waveform is used between the energy source and the receiver. Finally, a means of displaying the images created by the interaction of the coherent electromagnetic beam with target is employed.

12 Claims, 15 Drawing Sheets

— Prior Art —

COHERENT HYBRID ELECTROMAGNETIC FIELD IMAGING

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to a system and method for the remote acquisition of information about an object using electromagnetic field imaging, and, more particularly, to use of coherent hybrid electromagnetic waves to perform imaging of an object.

BACKGROUND OF THE INVENTION

The present invention is founded on electromagnetic-field scalar projection principles and optimal matched filter concepts that define a hybrid field detection process capable of coherently imaging millimeter radio-frequency (mmRF) through Ultra-Violet (UV) optical fields without optical filtering, scanning, or use of other moving components, while at the same time preserving the simplicity of conventional, direct-detection hardware.

The physics governing the conveyance of spatial information with electromagnetic fields is described by the well know Huygens-Fresnel principle. In essence, the principle treats the scattering of scalar electromagnetic fields, e.g., from an extended target's surface, as the superposition of interfering wavelets emanating from scattering centers distributed over the target. Conveyance of the resulting spatial information from a target to a detector is through transverse co-phasal surfaces oriented normal to the longitudinal direction of propagation.

Referring to FIG. 1, spatial amplitude and phase distributions comprising the transverse field are contained in the two-dimensional surface (x, y) normal to the longitudinal direction of propagation (z) with constant phase surfaces separated by a wavelength. The propagating object field conveys spatio-temporal image information to an observer or detector at z via temporal variations in the spatial amplitude and phase.

Observation of the spatio-temporal information will, in one form or another, ultimately reduce to a power measurement that requires extraction of energy from the propagating field. The basic field detection processes are generally categorized as either coherent or incoherent.

Incoherent detection subjects the field to a process referred to as squared modulus or square-law detection, for example, when imaging visible light with eyes, film, CCD camera or other photosensitive device. Ideal square-law detection of a complex scalar field consisting of the spatial amplitude and phase distribution, $\psi(x,y,z,t)$, results in the following intensity distribution $$I(x,y,t) \propto |\psi(x,y,z,t)|^2 = \psi(x,y,z,t) \cdot \psi(x,y,z,t)^*, \quad (1)$$

where "*" is the complex conjugation operator. Note that all phase information is lost in the detection process.

A coherent detection process endeavors to preserve phase information via the interferometric (homodyne or heterodyne) mixing of the object (image) field, $\psi(x,y,z,t)$, with a known reference field, $\psi_{Ref}(x,y,z,t)$, followed by square-law detection and filtering, such that the interfering cross term is extracted $$|\psi(x, y, z, t) + \psi_{Ref}(x, y, z, t)|^2 \underset{Filter}{\Longrightarrow} \psi(x, y, z, t) \cdot \psi_{Ref}(x, y, z, t)^*. \quad (2)$$

The fundamental advantages of coherent over non-coherent detection processes include the ability of filterless separation of object field from clutter signals and background, controlled noise bandwidths, and coherent amplification. Coherent imaging will enable system designers to exploit a broad range of coherent detection processes including phase/frequency discrimination, Doppler, range, three-dimensional imaging, synthetic aperture imaging, speckle manipulation, and multi-wavelength spectroscopy and interferometry.

The highly idealized coherent detection process implied by Equation 2 is extremely difficult to achieve at shorter mm-RF through optical wavelengths in practice. This is because the implementation of Equation 2 for coherent imaging is hindered by the intrinsic difficulty in matching the spatial and temporal field components of object and reference fields at shorter wavelengths. In essence, the image- and reference-field's time-varying spatial amplitude, phase, and polarization distribution (FIG. 1) become more difficult to match when the transverse dimensions of the receiver aperture are large when compared with the field's wavelength.

As detailed in U.S. Pat. No. 5,875,030, Method and Apparatus for Coherent Electromagnetic Field Imaging Through Fourier Transform Heterodyne, issued on Feb. 23, 1999, to Cooke et al., the spatio-temporal matching of object field and reference field is essential for coherent field imaging. Coherent field imaging can be perceived as the scalar projection of the reference field onto the object field with the intermediate-frequency signal current conveying the amplitude and phase of the projection. In other words, only image field and reference field states that are spatio-temporal matched will contribute to image formation. Hence, a stable coherent imaging process requires the precise temporal and spatial matching of object field and reference field states. Hence, the progressive loss in spatio-temporal coherence between object and reference fields will eventually lead to the systematic phase and amplitude degradations in the detection process, resulting in the loss of conversion efficiency, corrupted image retrieval, and increased noise bandwidth.

For these reasons, state of the art in coherent imaging must address real environments where spatio-temporal mismatches are introduced by a variety of means including transceiver source drift and fluctuations, atmospheric turbulence, scattering from extended (rough) targets, and target motion. For example, unavoidable temporal mismatches between image and reference fields resulting from the finite coherence length of the laser source, and target induced Doppler shifts necessitate a receiver with large detection bandwidths ($\sim 10^7 - 10^8$ Hz). This prohibits the use of readily available focal plane array or CCD imaging technology, which are limited to 1000 Hz or less. The limitations imposed by large bandwidths are currently overcome by building up an image through synchronous target scanning, i.e., the rastering of a narrow laser beam across a target and building the image one sample element per unit time. With synchronous scanning, detection elements in the receiver may be limited to a single detector or to small (2×2-4×4) arrays. However, the resulting scanned image is not necessarily spatially coherent, or correlated, as the image is constructed from effectively independent samples.

Assuming the availability of high-bandwidth large-format imaging arrays, present heterodyne techniques would suffer from relatively poor and unstable detection efficiencies. Spatial mismatches between image and reference fields caused by source, atmosphere, and target-induced field fluctuations and distortion result in low coherent detection efficiencies. Compounding the low detection efficiencies are the superimposed scintillation-induced fluctuations. Scintillation is the result of time varying constructive and destructive phase fluctuations between image and reference fields and can completely dominate the image signal-to-noise ratio (SNR) statistics.

U.S. Pat. No. 5,875,030 addresses the spatial mismatches inherent in coherent imaging. The method decomposes the spatial components of the image field in terms of spatial reference functions. Selection of appropriate spatial basis functions allows image retrieval by way of classic Fourier manipulations enabling the direct imaging of the transverse amplitude, phase, and Doppler shift of coherent electromagnetic fields. However, one limitation with Fourier Transform Heterodyne (FTH) is that the image must remain stationary during the time required to build up the Fourier coefficients. This is because FTH employs a single-element detector and requires the serial scanning of basis functions for acquisition of one image coefficient at a time. Any movement or change in the target image during this period will cause an error during image retrieval.

The present invention builds on scalar projection and FTH principles, thereby enabling practical coherent imaging systems based on conventional focal plane array or CCD imaging technology, without the serial scanning of basis functions required in FTH. The present invention permits the engineering of electromagnetic fields for optimal coherent field imaging at short wavelengths. These so-called hybrid fields provide the mechanism through which the spatial and temporal matched filter conditions required for short-wavelength coherent detection are realized.

A hybrid field is the superposition of two or more matched fields, with coherent detection uniqueness introduced through the selective spatial or temporal modulation of one field relative to its identical match. Modulation formats include amplitude, phase, frequency and polarization, and are necessary because they create a uniquely detectable interferometric signature under square-law detection.

In contrast to the current practice of coherently mixing the return field, the hybrid is coherently mixed (interfered) before leaving the transmitter source, e.g., reducing transceiver and environmental spatio-temporal mismatches. Furthermore, hybrid mixing transforms the coherent detection process from one proportional to the (short) carrier wavelength, $\lambda_o$ [m], to one proportional to a longer synthetic wavelength, $\lambda_s$ [m]. This transformation applies to all interferometric processes, including object-to-reference field coherence, sampling requirements, spatial resolution, and range/Doppler. Hence the ability to mix before transmission, and the generation of controlled synthetic wavelengths permits efficient coherent detection of range, Doppler, and multi-channel imaging with conventional focal plane array or CCD imaging technology. This precise control over the hybrid field enables achieving the spatial and temporal matched filter condition, e.g., the precise temporal and spatial matching of all object and reference field states, for error free imaging.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes an apparatus and corresponding method for coherent hybrid electromagnetic field imaging of a target. An energy source is used to generate a propagating electromagnetic beam, an electromagnetic beam splitting means to split the beam into two or more coherently matched beams of about equal amplitude, and where the spatial and temporal self-coherence between each two or more coherently matched beams is preserved. Two or more differential modulation means are employed to modulate each two or more coherently matched beams with a time-varying polarization, frequency, phase, and amplitude signal. An electromagnetic beam combining means is used to coherently combine said two or more coherently matched beams into a coherent electromagnetic beam. One or more electromagnetic beam controlling means are used for collimating, guiding, or focusing the coherent electromagnetic beam. One or more apertures are used for transmitting and receiving the coherent electromagnetic beam to and from the target. A receiver is used that is capable of square-law detection of the coherent electromagnetic beam. A waveform generator is used that is capable of generation and control of time-varying polarization, frequency, phase, or amplitude modulation waveforms and sequences. A means of synchronizing time varying waveform is used between the energy source and the receiver. Finally, a means of displaying the images created by the interaction of the coherent electromagnetic beam with target is employed.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
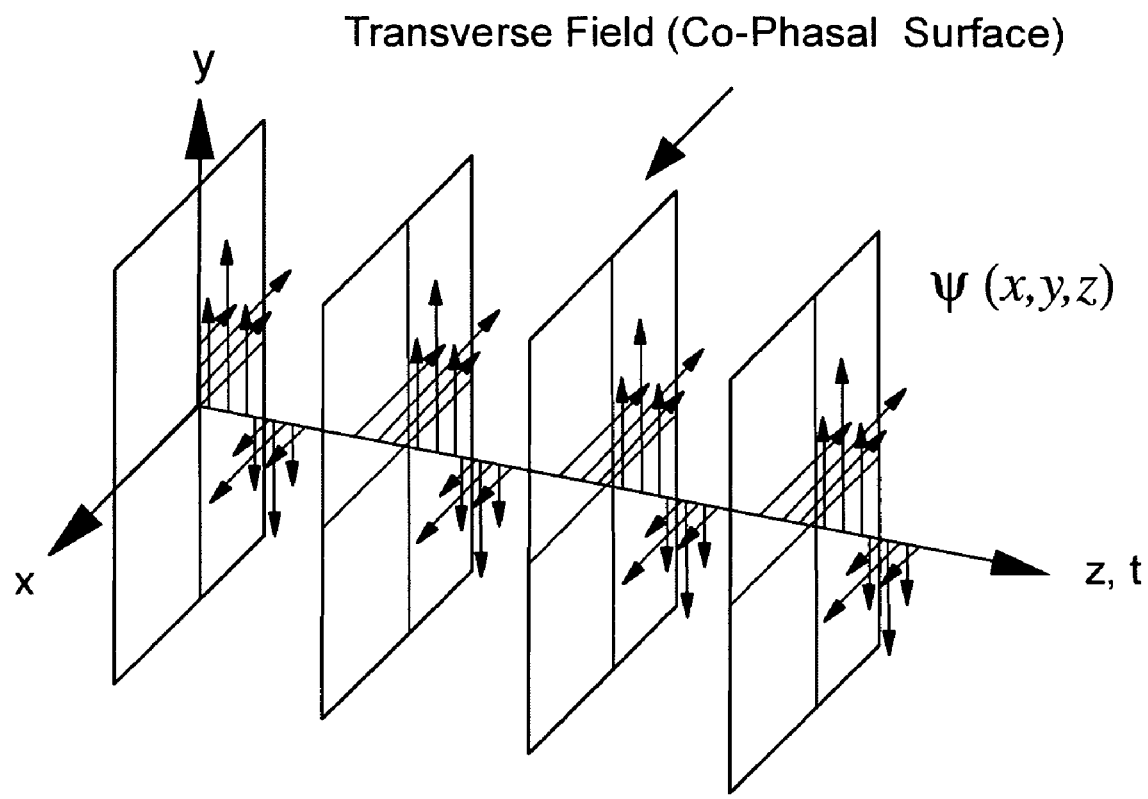
FIG. 1 is an illustration of the spatial amplitude and phase distributions contained in the transverse surface normal to the direction of propagation (z).

The present invention, includes an apparatus and method for optical imaging of an object or objects that uses electromagnetic radiation in the form of a beam, where the beam is split, interferometerically combined, coherently interfered, and coherently combined into a coherent hybrid field before the beam ever leaves the transmitter.

A viable coherent optical imaging technology holds the potential of significantly enhancing millimeter radio-frequency (mmRF) through ultraviolet (UV) remote sensing sensitivity over present incoherent direct-detection or coherent scanning technology. The fundamental advantages of coherent over incoherent detection processes include the filterless discrimination of signal photons from background photons, controlled noise bandwidths, and coherent amplification. Furthermore, coherent processes enable system designers to exploit a broad range of imaging detection formats including Doppler, range, amplitude, phase, pulsed or CW modes, speckle manipulation, and multi-wavelength spectroscopy. A coherent imaging system should be capable of supporting the simultaneous transmission and detection of multiple laser lines for true spatial-temporal coherent laser spectroscopy. When coupled with phase and frequency interferometric ranging, the system is further capable of furnishing a 3D multi-spectral differential absorptance, reflectance, or scatter image.

Coherent optical imaging technology is based on the concept of mixing an image field with a reference field at the receiver. Upon detection, the mixed fields generate a unique signature enabling separation from background noise and clutter. Development of practical coherent imaging technology in the physical optics domain has been significantly hampered by the inherent difficulty in matching the spatial and temporal states of the image and reference fields. The spatial and temporal states characterize a field's time varying spatial distribution and include the temporal frequency and phase, and spatial amplitude, phase, and polarization.

Formation of a stable image through coherent detection processes requires precise matching of image and reference field states, or the systematic noise generated by the time-varying state mismatches will degrade and dominate the resulting image statistics. Typically, the reference field is generated locally at the receiver (also known as the local oscillator) or directly sampled off of the transmitted primary. Unavoidable temporal mismatches between image and reference fields resulting from the finite coherence length of the source, and target induced Doppler shifts necessitate a receiver with large detection bandwidths (~$10^7$-$10^8$ Hz), and prohibit the use of readily available focal plane array or CCD imaging technology. The limitations imposed by large bandwidths are currently overcome by building up an image through synchronous target scanning, i.e., the rastering of a narrow laser beam across a target and building the image one sample element per unit time. With synchronous scanning, detection elements in the receiver may be limited to a single detector or to small (2×2-4×4) arrays. However, the resulting scanned image is not necessarily spatially coherent, or correlated, as the image is constructed from effectively independent samples.

Assuming the availability of high-bandwidth large-format imaging arrays, present heterodyne techniques would suffer from relatively poor and unstable detection efficiencies. Spatial mismatches between image and reference fields caused by source, atmosphere, and target-induced field fluctuations and distortion result in low coherent detection efficiencies. Compounding the low detection efficiencies are the superimposed scintillation-induced fluctuations. Scintillation is the result of time-varying constructive and destructive phase fluctuations between image and reference fields and can completely dominate the image signal-to-noise ratio (SNR) statistics.

Generalized to three-dimensional (3-D) surfaces, the scalar field projection operator relating the interaction of the image and reference electromagnetic field distributions over the detection surface, s, is defined through Poynting's relation $$\left\{ \begin{array}{l} \psi_{image}(x, y, z, t, p, \omega), \\ \psi_{Ref}(x, y, z, t, p', \omega') \end{array} \right\} \Leftrightarrow \int\int_s J \cdot ds = k \int\int_s \eta(E \times H) \cdot ds, \quad (3)$$

where $\psi$ is the field, J is the induced current density, t the time variable, $\eta$ the detection efficiency, p the field polarization, and $\omega$ the radial frequency. For two-dimensional detector surfaces and transverse electromagnetic fields, Equation 3 may be explicitly written as:

$$\langle \psi_{Image}, \psi_{Ref} \rangle \equiv \quad (4)$$
$$\kappa \int\int_s \eta(x, y) \psi_{Image}(x, y, t, p, \omega) \cdot \psi_{Ref}(x, y, t, p', \omega')^* dxdy,$$

where $\kappa$ is a constant, and $$\psi_{Image}(x,y,t,p,\omega) = p\rho(x,y)e^{-i\omega t - i\theta(x,y)}, \quad (5)$$

$$\psi_{Ref}(x,y,t,p',\omega') = p'\rho'(x,y)e^{-i\omega't - i\theta'(x,y)}. \quad (6)$$

Figure 2:
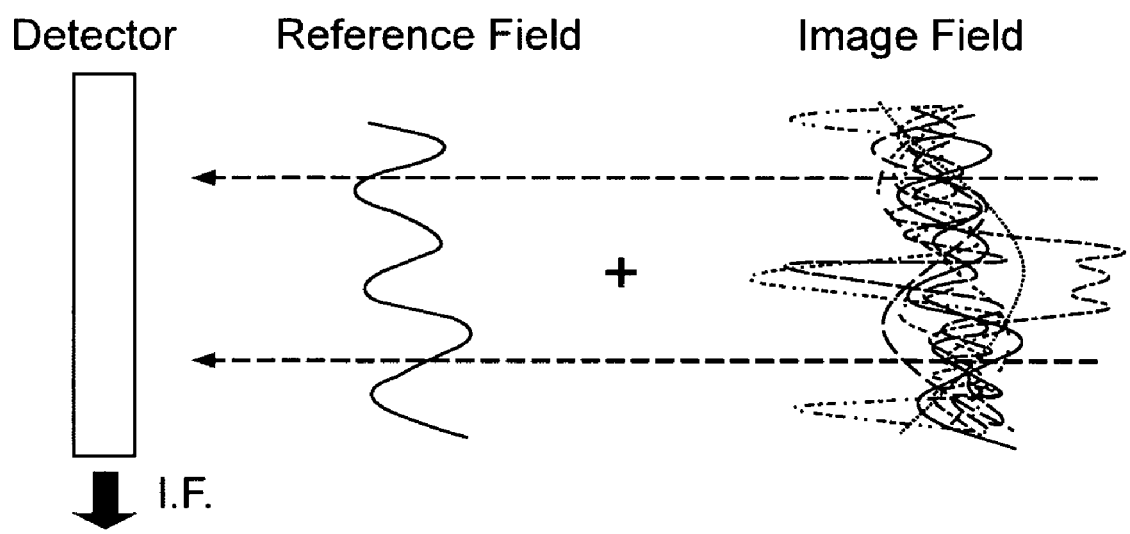
FIG. 2 is an illustration of scalar projection showing that only spatially matched reference and image fields will produce an I.F. signal.

The scalar projection properties of Equation 4 are illustrated in FIG. 2 through the basic heterodyned detection process where $\omega \neq \omega'$ with intermediate frequency (I.F.) $\Delta\omega = |\omega - \omega'|$.

The coherent detection of image and reference fields can be perceived as a scalar projection of the reference field onto the image field with the I.F. signal conveying the amplitude and phase of the projection. For mathematical convenience, the image and reference fields (Equation 5 and 6) of FIG. 2 have been expanded in terms of the orthonormal basis set $\Phi$.

Due to the orthogonal nature of the basis set, only the image field state in FIG. 2 spatially and temporally matching the reference field state, $A_n\Phi_n$, projects out an I.F. signal of energy $A_n^2$. The coherent detection efficiency is defined as the ratio of detected I.F. signal energy to the image field's total signal energy. For the example given in FIG. 2, the detection efficiency reduces to the ratio of expansion coefficients $A_i$ $$\eta_h = \frac{|\langle \psi_{Ref}, \psi_{Image} \rangle|}{|\langle \psi_{Image}, \psi_{Image} \rangle|} = \frac{|A_n|^2}{\sum_i |A_i|^2}. \qquad (7)$$

Equation 7 shows the influence of reference and image field mismatches on coherent detection efficiency. Mismatches resulting from source, atmosphere, and target-induced fluctuations and distortion siphon energy out of the designated state, $\Phi_n$, and into states not contributing to detected signal energy, therefore, lowering the detection efficiency. Equation 7 is also useful at illustrating the effects of phase-induced scintillation. As the image field fluctuates relative to the reference field, the energy is continually re-distributed over the expansion states $A_i \Phi_i$, resulting in the modulation of the detected I.F. signal energy. The actual magnitude of degradation in detection efficiency and degree of signal scintillation is dependent on several system parameters that govern the number of mismatched states present at the detector including the degree of field distortion and system optical resolution.

The key to maximizing Equation 7 (and hence high detection efficiency) is best expressed through spatial-temporal matched filter concepts. The detection efficiency is maximized when image and reference field states including time, frequency, polarization, and spatial amplitude and phase distribution are precisely matched, i.e., $$\psi_{Ref} = \psi_{Image}, \qquad (8)$$

resulting in $$\eta_h = \frac{\langle \psi_{Ref}, \psi_{Image} \rangle}{\langle \psi_{Image}, \psi_{Image} \rangle} \Rightarrow 1. \qquad (9)$$

The conditions illustrated in Equations 8 and 9 are referred to as the matched filter condition and are essential for optimal detection processes.

Hybrid fields provide the mechanism through which the spatial and temporal matched filter condition of Equations 8 and 9 may be applied, thereby enabling the practical synthesis of highly optimized electromagnetic field detection processes. Hybrid fields are superpositions of two or more matched fields with coherent detection uniqueness introduced through the selective perturbation or modulation of one set of field states relative to its match, creating a uniquely detectable differential signature. Differential signature formats include temporal frequency and phase, spatial phase and amplitude, and polarization. For example, a matched-filter heterodyned detection process would be realized through the introduction of a differential frequency offset between reference and image fields while matching the remaining field states, thus resulting in high detection efficiency and stability.

Figure 3:
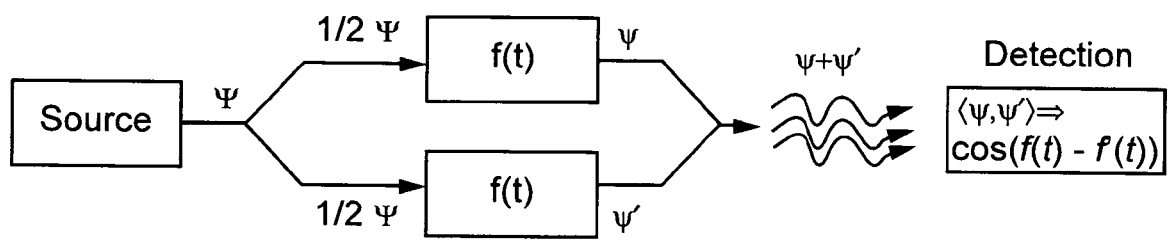
FIG. 3 is a diagram of basic temporal dual-field hybrid processes
Figure 4:
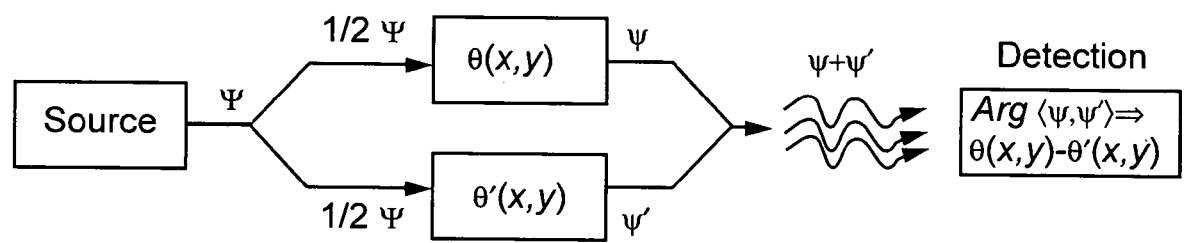
FIG. 4 is a diagram of transverse-phase dual-field hybrid processes

Diagrams of basic temporal, transverse-phase, and transverse-amplitude dual-field hybrid processes are illustrated in FIGS. 2, 3 and 4, respectively. An energy source, either RF or optical energy source, e.g., lasers, masers, light emitting diodes, lamps, or RF generators, produce the initial electromagnetic beam, $\Psi$, which is split into two coherently matched beams with an electromagnetic beam splitting means. The two beams are modulated with a differential modulation means that apply a time varying polarization, frequency, phase, and/or amplitude signal, and recombined for transmission with an electromagnetic beam combining means. Coherent electromagnetic beam splitting and combining may be accomplished with free-space beam splitters, n-port fiber-optic splitters, integrated waveguides, coaxial cable splitters, waveguide splitters, and tees. Collimating, guiding, or focusing the beam is accomplished through electromagnetic beam controlling means such as apertures, lenses, waveguides, reflectors, mirrors, and fiber optics. Squared modulus or square-law detection of temporal, transverse-phase, and transverse-amplitude modulated hybrids results in Temporal: $\langle \psi, \psi' \rangle \Rightarrow \cos(f(t) - f'(t))$, (10)

Transverse Phase Arg $\langle \psi, \psi' \rangle \Rightarrow \theta(x,y) - \theta'(x,y)$, (11)

Transverse Amplitude: $\langle \psi, \psi' \rangle \Rightarrow \rho(x,y) \cdot \rho'(x,y)$. (12)

A suitable optical sensor capable of square law detection include the single element detector or imaging focal plane arrays constructed of an array of single detectors such as conventional photodiode, photo resistive, photoconductive, charge coupled device, bolometer, and photoemission.

Figure 5:
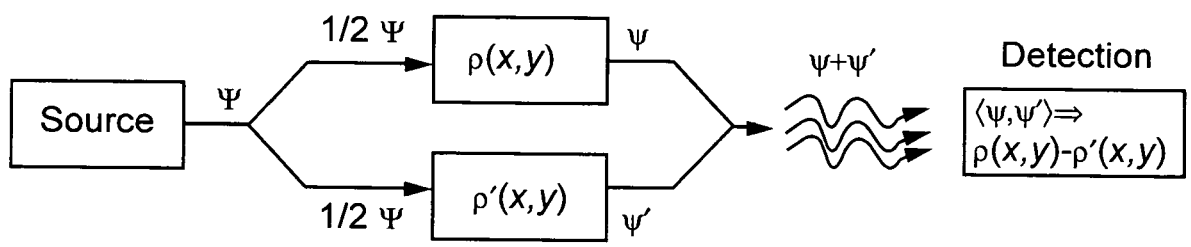
FIG. 5 is a diagram of transverse-amplitude dual-field hybrid processes
Figure 6:
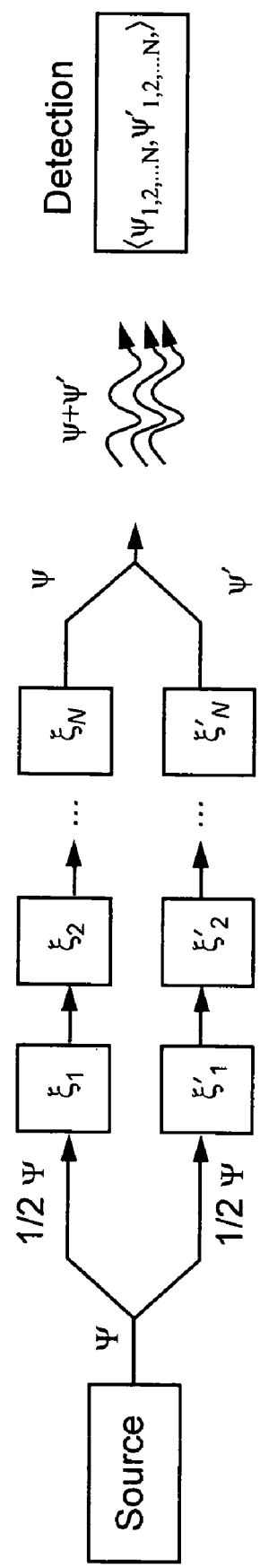
FIG. 6 is a diagram of showing a generalization of the dual-field hybrid process serially combining the processes shown in FIGS. 3-5.
Figure 7:
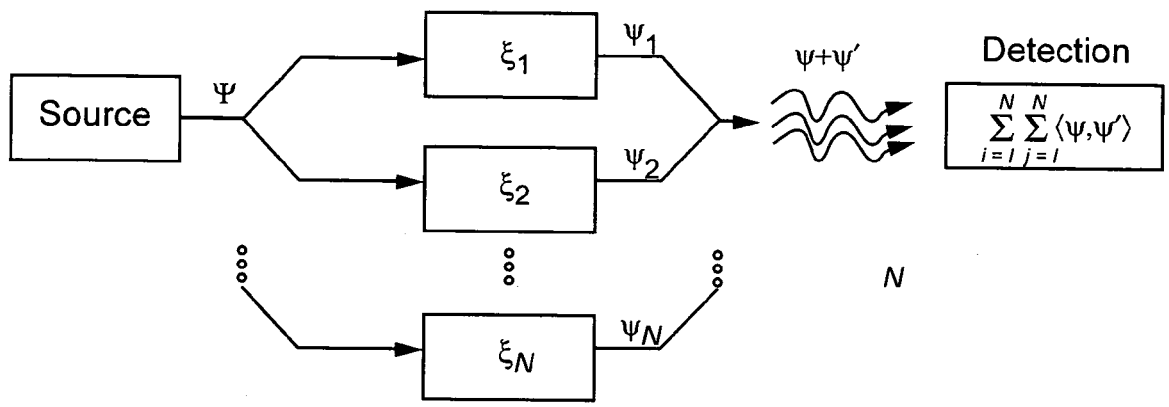
FIG. 7 is a diagram of showing a generalization of the dual-field hybrid process permitting the parallel combination of the processes shown in FIGS. 3-6.
Figure 8:
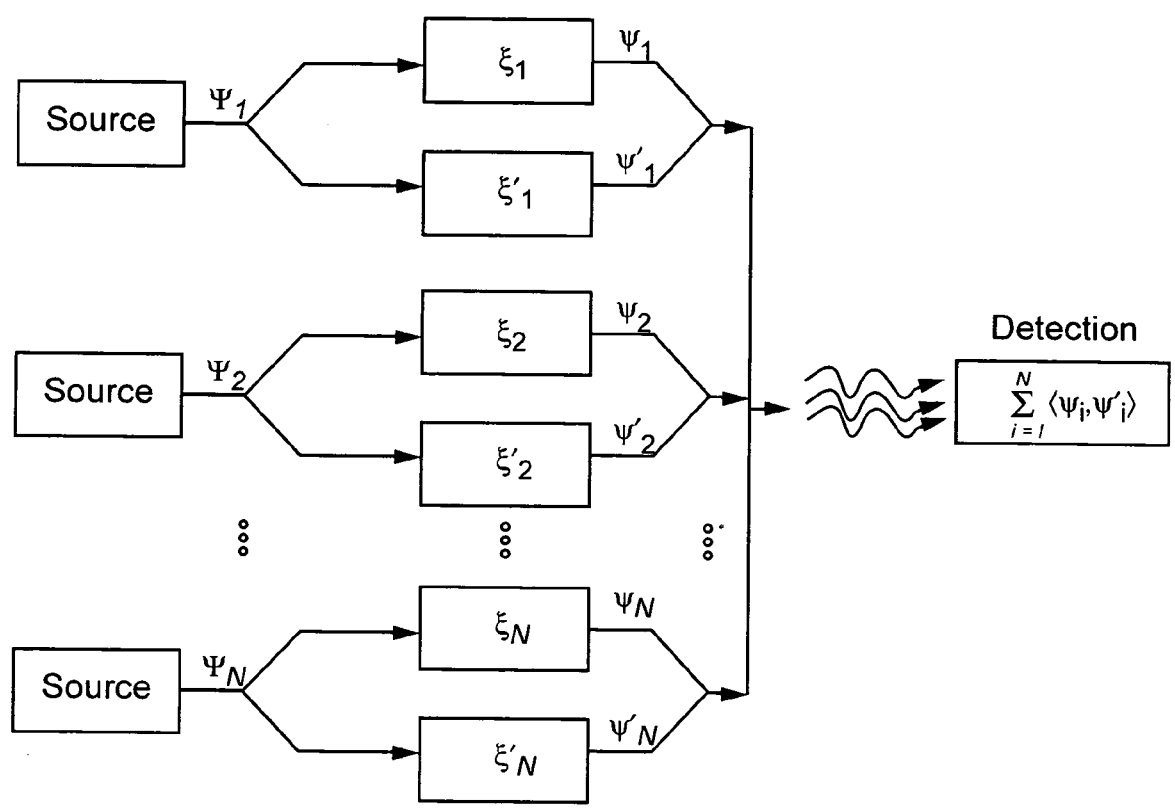
FIG. 8 is a diagram of showing multiple parallel dual-field hybrid process shown in FIGS. 3-5.

The basic temporal and spatial operations of FIGS. 3-5 may be combined to form complex topographies based on compound temporal and spatial functions operating on two or more fields. Generic topologies are illustrated in FIGS. 6-8 with the $\xi_l$ representing temporal and/or spatial operators.

In all cases, the hybrid field detection processes depicted in FIGS. 3-8 result in high detection efficiencies and low scintillation. The temporal and spatial field fluctuations and distortions due to source, atmosphere, and target are identically superimposed upon matched hybrid states resulting in cancellation during detection. As a practical example, a hybrid's inherent common-mode rejection of atmospheric induced spatial phase distortion enables deployment of high-gain, coherent communication systems employing aperture diameters far exceeding the atmospheric coherence length.

Basic Hybrid Field Imaging (HFI)

Figure 9:
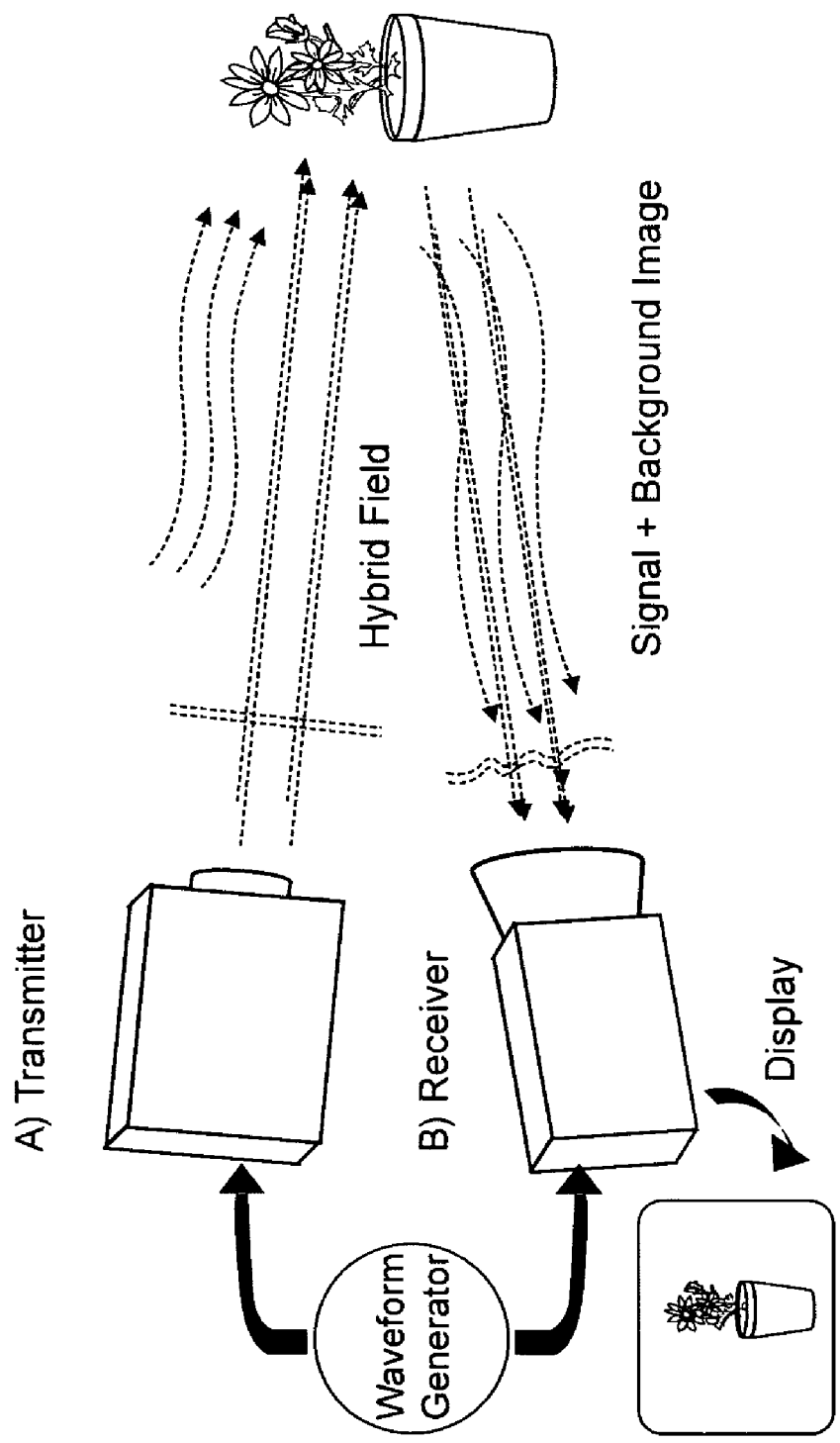
FIG. 9 is a schematic showing the basic hybrid field image capture process in the presence of background light.
Figure 10:
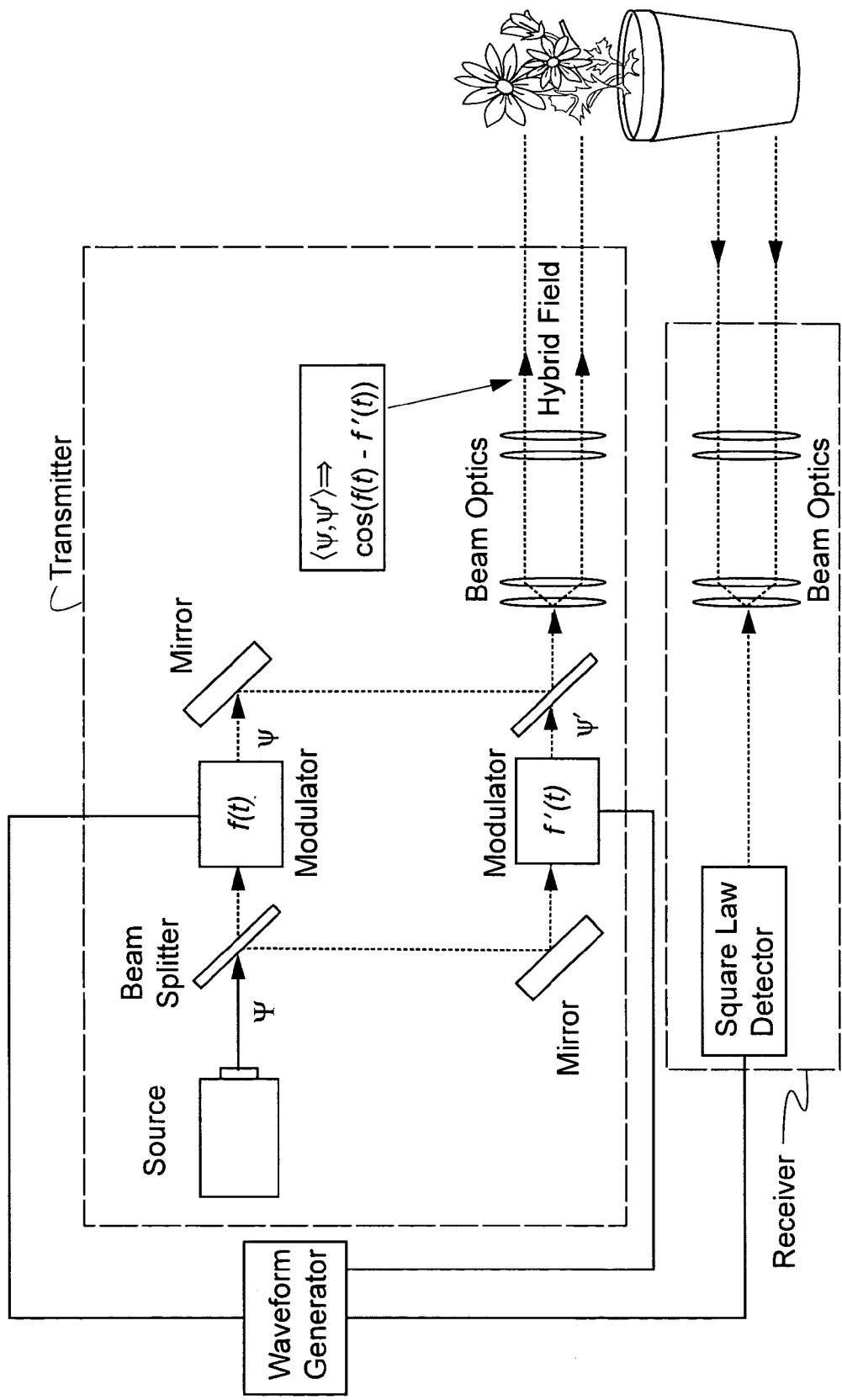
FIG. 10 is a schematic diagram showing details of the transmitter and receiver of FIG. 9.
Figure 11:
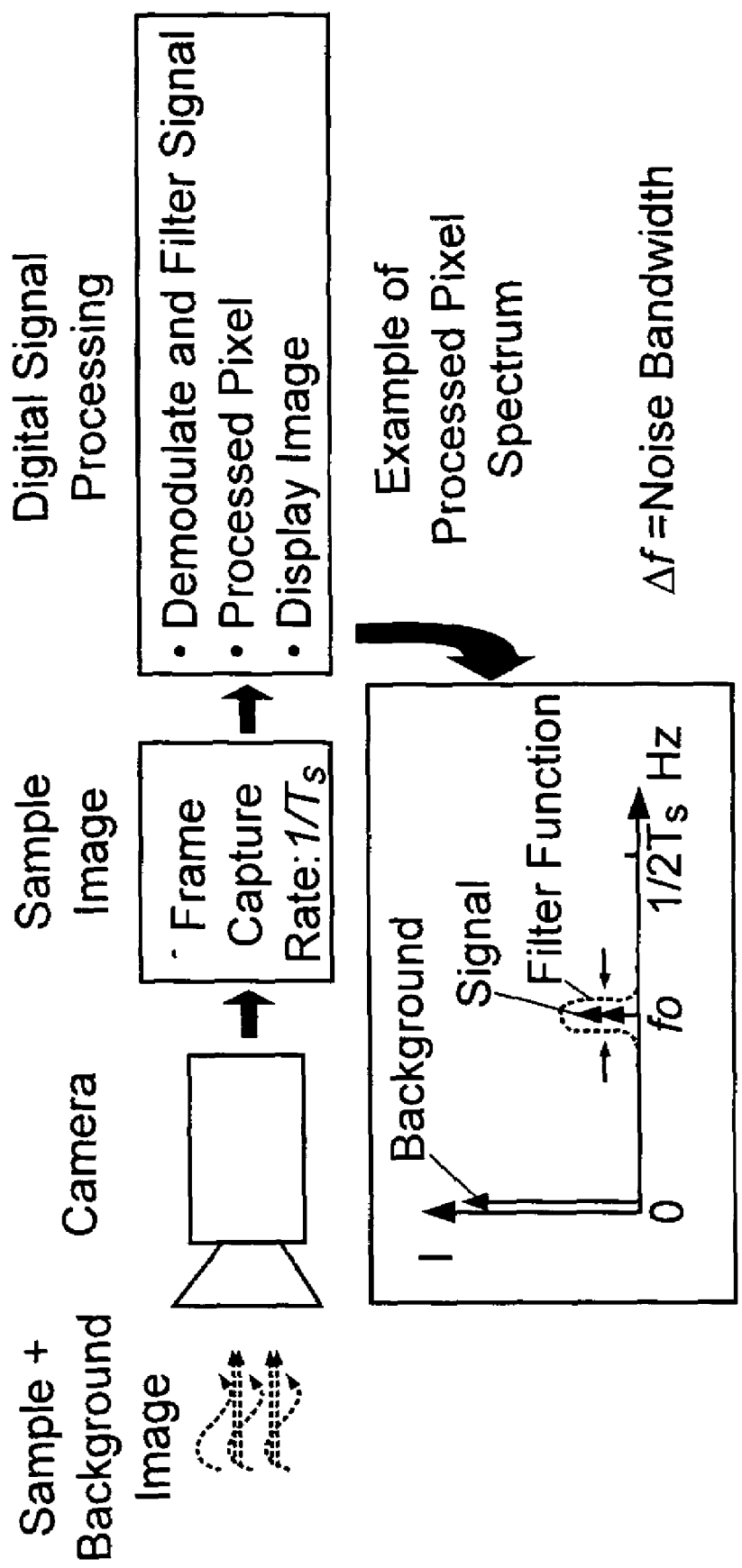
FIG. 11 is a functional diagram of the rudimentary receiver blocks required for the temporal phase/frequency de-coding (of the hybrid produced by FIG. 10).

The basic hybrid field image capture process is summarized in FIG. 9. The transmitter illuminates the target with a temporally encoded hybrid field. Keyed to the modulation function, the receiver detects and demodulates the hybrid image, enabling the unique separation of signal image from background sources. FIGS. 10 and 11 functionally diagram the rudimentary transmitter and receiver blocks required for spatial and temporal phase/frequency encoding; apertures for transmitting and receiving the electromagnetic beam may be fashioned with a lens, antennae, fiber optic, waveguide, or telescope.

Various free-space and dielectric-guided means of generating, modulating, and transmitting optical hybrid fields are available; however, the most straightforward technique is schematically depicted in FIG. 10. The simple interferometer-based topology enables differential phase, frequency, and polarization encoding of the hybrid field. The optical energy source generates the initial electromagnetic beam, $\Psi$, which is split into two coherently matched beams, modulated, and recombined for transmission.

The topology provides precise field alignment during field manipulations, thereby coherently preserving field states and enabling the employment of coherent or incoherent sources. Differential modulation of one field relative to the other is accomplished through a variety of optical devices and commensurate materials technologies including electro-optic phase modulators, acousto-optic frequency modulators, liquid crystal phase and polarization modulators, and amplitude modulated sources. A waveform generator is utilized for generating and controlling the time-varying polarization, frequency, phase or amplitude modulation. The differential modulation of the topology of FIG. 10 provides the means of encoding the hybrid field with the temporal modulation function, $f(t) - f'(t)$, which yields under squared modulus detection $\langle \psi, \psi' \rangle \Rightarrow I[1 + \eta_h \cos(f(t) - f'(t))]$, (13)

where $\eta_h$=hybrid coherent detection efficiency.

As field imaging is of primary interest, the receiver image chain is required to incorporate a camera or other suitable imaging array technology, which samples the image at a rate of $1/T_s$ frames per second. For efficient demodulation of the received signal, a means of synchronizing the generated waveforms between source (transmitter) and receiver is necessary and can be implemented through an RF, optical, cable, or fiber optic link. The detection process is illustrated in FIG. 11, each pixel in the image array detects both a background intensity plus the hybrid signal intensity (Equation 13) with the total time-varying intensity at the i,j$^{th}$ pixel given by $$\Phi_{i,j}(t) = I_{bkg_{i,j}} + I_{s_{i,j}}[1 + \eta_{h_{i,j}} \cos(f(t) - f'(t))], \quad (14)$$

where i,j span the N×M array, i=1, 2, ... N, j=1, 2, ... M. Provided the bandwidth of the hybrid signal (Fourier transform of Equation 13), falls within the sampled array's Nyquist bandwidth, $1/(2T_s)$, the detected hybrid field image may be demodulated, filtered, and uniquely separated from the background image. The detection noise bandwidth and effective optical bandwidth, $\Delta f$, is determined by the transmitted modulation format, f(t)-f'(t), and receiver demodulation and filter format. As the modulated signal is differentially conveyed through the hybrid's intermediate frequency, analog and digital modulation formats currently employed in today's RF communication systems including continuous-wave through pulse amplitude, frequency, phase, spread spectrum, and pulsed pseudo-noise sequences, are applicable. The resulting separated images are viewed through a means of displaying images, e.g., film and electronic video display.

Figure 12:
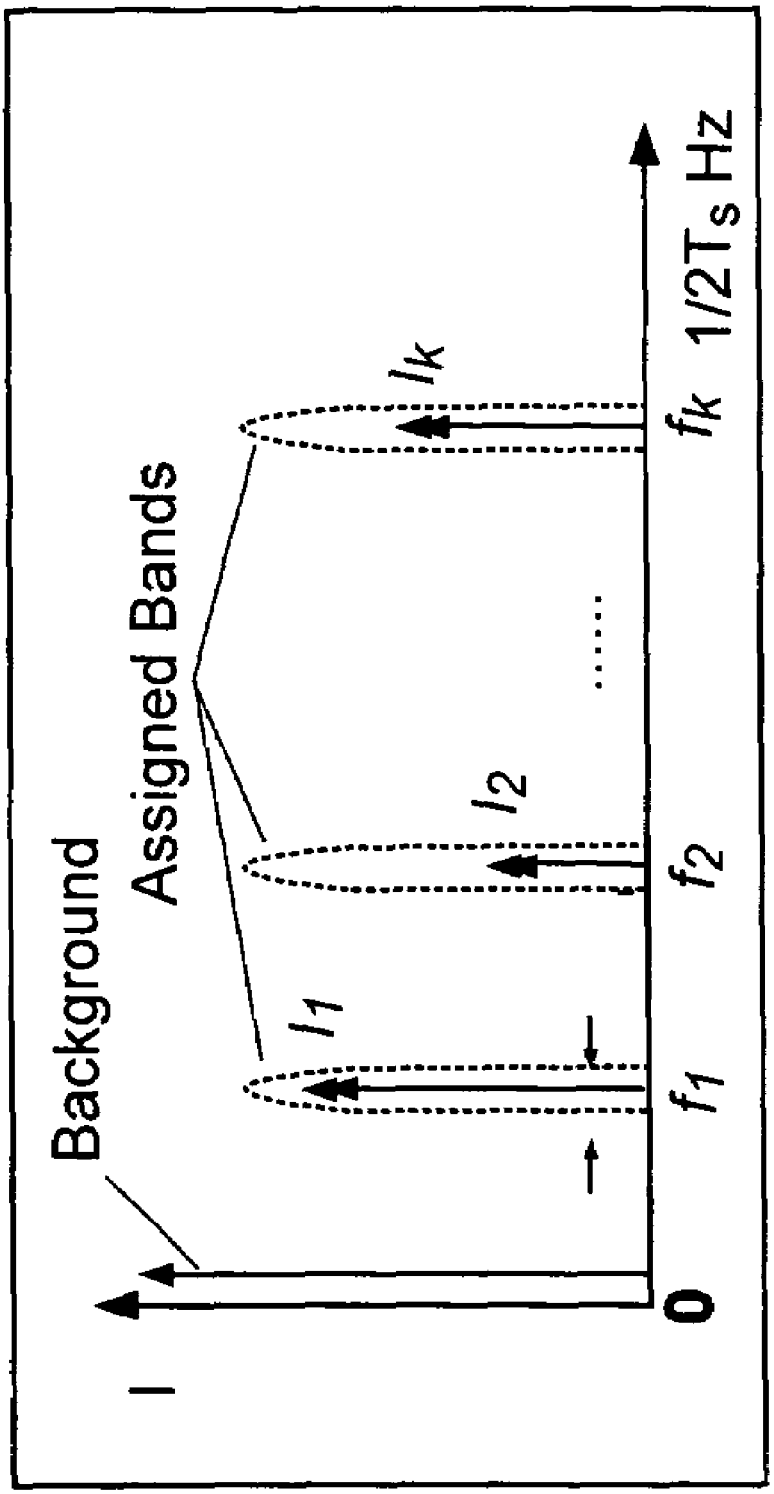
FIG. 12 illustrates the extension of the single band hybrid imaging process shown in FIGS. 10 and 11 to multiple bands.

Applying the multi-source topology of FIG. 8, the HFI detection process is readily extended to multiple bands for true spatial-temporal coherent imaging capabilities. Similar to commercial radio or television, each source is assigned a channel occupying a designated bandwidth as illustrated in FIG. 12. The pixel level demodulation and filtering of the composite K-band intensity, $$\Phi_{i,j}(t) = I_{bkg_{i,j}} + \sum_{k=1}^{K} I_{s_{i,j,k}} \left[1 + \eta_{h_{i,j}} \cos(f_k(t) - f'_k(t))\right] \quad (15)$$

results in the separation and retrieval of K+1 images corresponding to the K-bands plus the DC background image. Multi-band applications of interest include laser spectroscopy, active polarimetry, phase interferometry, and speckle mitigation. Spatially and temporally coherent imaging spectroscopy enables multi-spectral differential absorptance, reflectance, and scatter laser imaging for precision spectroscopic measurements through common mode cancellation of atmospheric, target albedo, and instrumentation drift.

It should be noted that Equations 13-15 are suitable for spectrally pure sources. For spectrally broad sources (incoherent white or colored light), the spectrally pure field operator must be replaced with the integral operator $$\langle \psi, \psi' \rangle \Rightarrow \int_{\Delta k} S(k) \langle \psi(k), \psi'(k) \rangle dk, \quad (16)$$

where S(k) is the source distribution function and k the spectral wavenumber [cm$^{-1}$].

Doppler and Range Imaging

Figure 13:
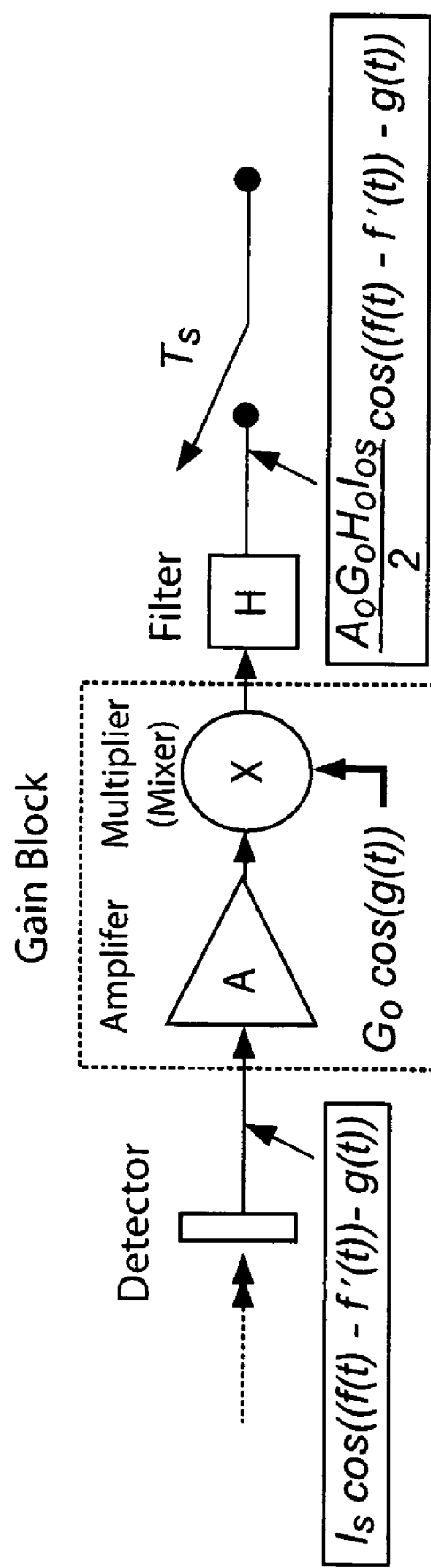
FIG. 13 is a functional diagram of the pixel level circuitry required for hybrid field coherent gain, Doppler imaging, and range imaging.

As hybrid fields convey information through differential modulation, squared modulus detection of an appropriately modulated hybrid will yield an electronic waveform that may be treated and processed as one would a conventional RF or intermediate frequency (I.F.) signal. This enables the development of Doppler and range imaging mm-RF/optical systems that employ standard RF/I.F. integrated circuitry concepts including coherent gain stages, mixers, filters, and demodulators. The basic pixel level circuitry required for coherent gain, Doppler imaging, and range imaging is schematically depicted in FIG. 13.

Figure 14:
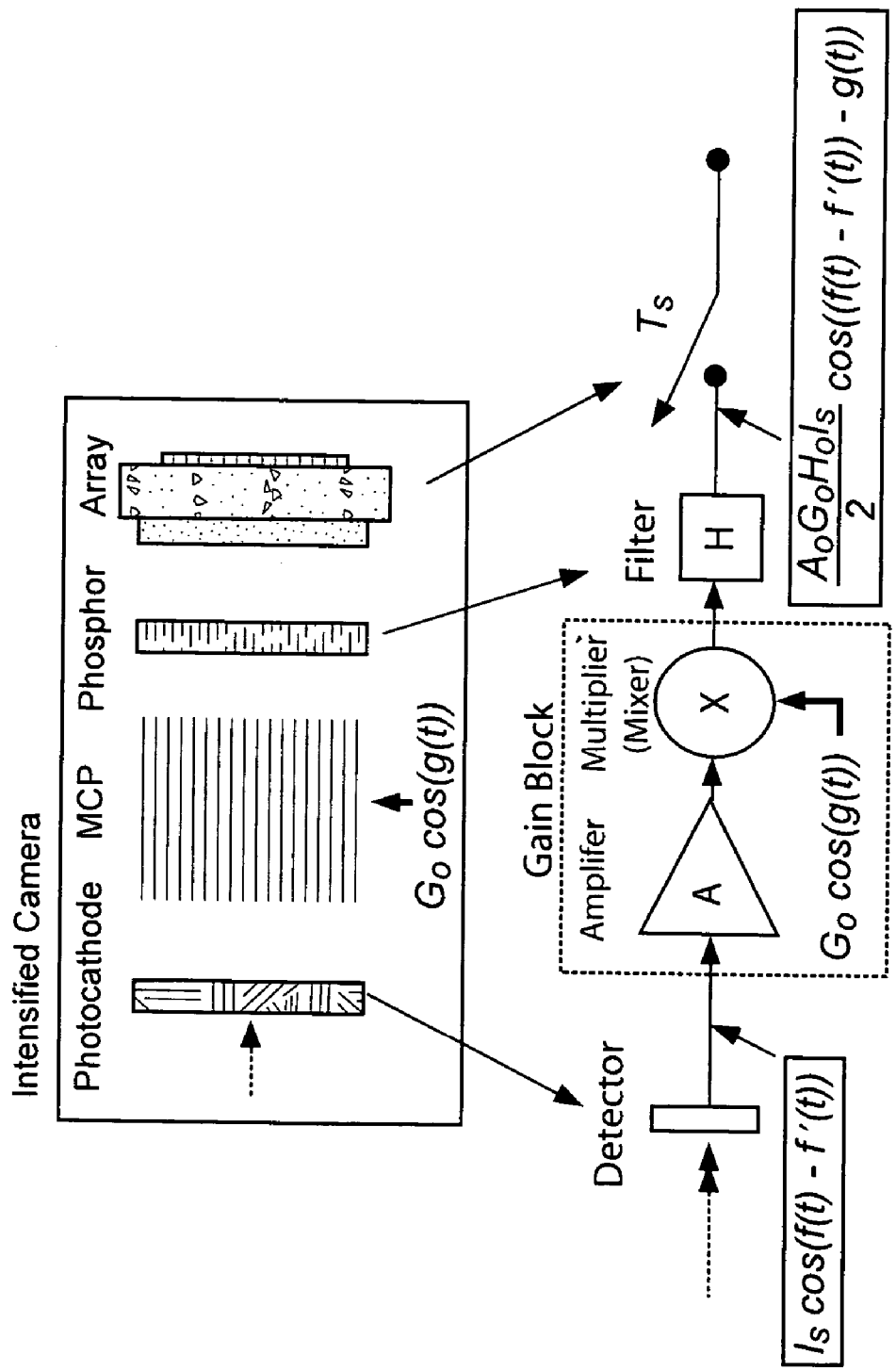
FIG. 14 is the realization of the amplifier and mixer block of FIG. 13 by direct modulation of an intensified camera's multi-channel plate (MCP) gain stage.

The circuit consists of a squared modulus detector that extracts the differential signal from the hybrid, a multiplying gain block, a lowpass or bandpass filter, and a sampling circuit. In traditional RF circuits, the gain block typically consists of a low-noise amplifier driving a mixer for both gain and down conversion. For optical imaging applications, the amplifier and mixer need not be distinct components. As illustrated in FIG. 14, the amplifier and mixer block of FIG. 13 may be effectively synthesized through the direct modulation of an intensified camera's multi-channel plate (MCP) gain stage. Technologies for building focal plane arrays that enable direct gain-stage modulation include multi-channel plate or image intensified tube, avalanche photodiodes, multi-quantum well photodetectors, and extrinsic semiconductor blocked impurity band devices.

The multiplier (mixer) and anti-aliasing filter are critical for the coherent down conversion from high-frequency hybrid bandwidths to the imaging array's Nyquist bandwidth of $1/(2T_s)$. From FIG. 13, the general form of the down converted and filtered signal is $$\frac{A_o G_o H_o I_s}{2} \cos((f(t) - f'(t)) - g(t)), \quad (17)$$

where the term $A_o G_o H_o$ represents the cascaded gain. The necessity for frequency and phase-coherent down conversion becomes evident if the bandwidth requirements for reasonable Doppler and range resolution are compared with currently available focal plane array bandwidths. The basic quantities of interest in Doppler and range imaging are propagation transit time delay, waveform phase shift, and frequency Doppler shift:

$$\text{Transit Delay: } \tau = 2\frac{R}{c} \text{ [sec]}, \quad (18)$$

$$\text{Phase Shift } \theta = \frac{4\pi(f - f')R}{c} \frac{1}{1 - \frac{v}{c}} \approx \frac{4\pi(f - f')R}{c} \text{ [rad]}, \quad (19)$$

$$\text{Doppler Shift: } f_d = (f - f')\frac{1 + \frac{v}{c}}{1 - \frac{v}{c}} \approx 2(f - f')\frac{v}{c} \text{ [Hz]}, \quad (20)$$

where R is the range in meters, v the target velocity in meters/second, and f-f' the effective hybrid field differential frequency (bandwidth) in Hertz. Note that hybrid bandwidths of $10^5$ to $10^8$ Hz are required for ~1 m range resolution, depending on the Doppler and range imaging algorithm implemented, while sampled focal plane bandwidths are limited to the $10^2$ to $10^4$ Hz range. The actual focal plane array sample rate will depend on pixel format and density.

Figure 15:
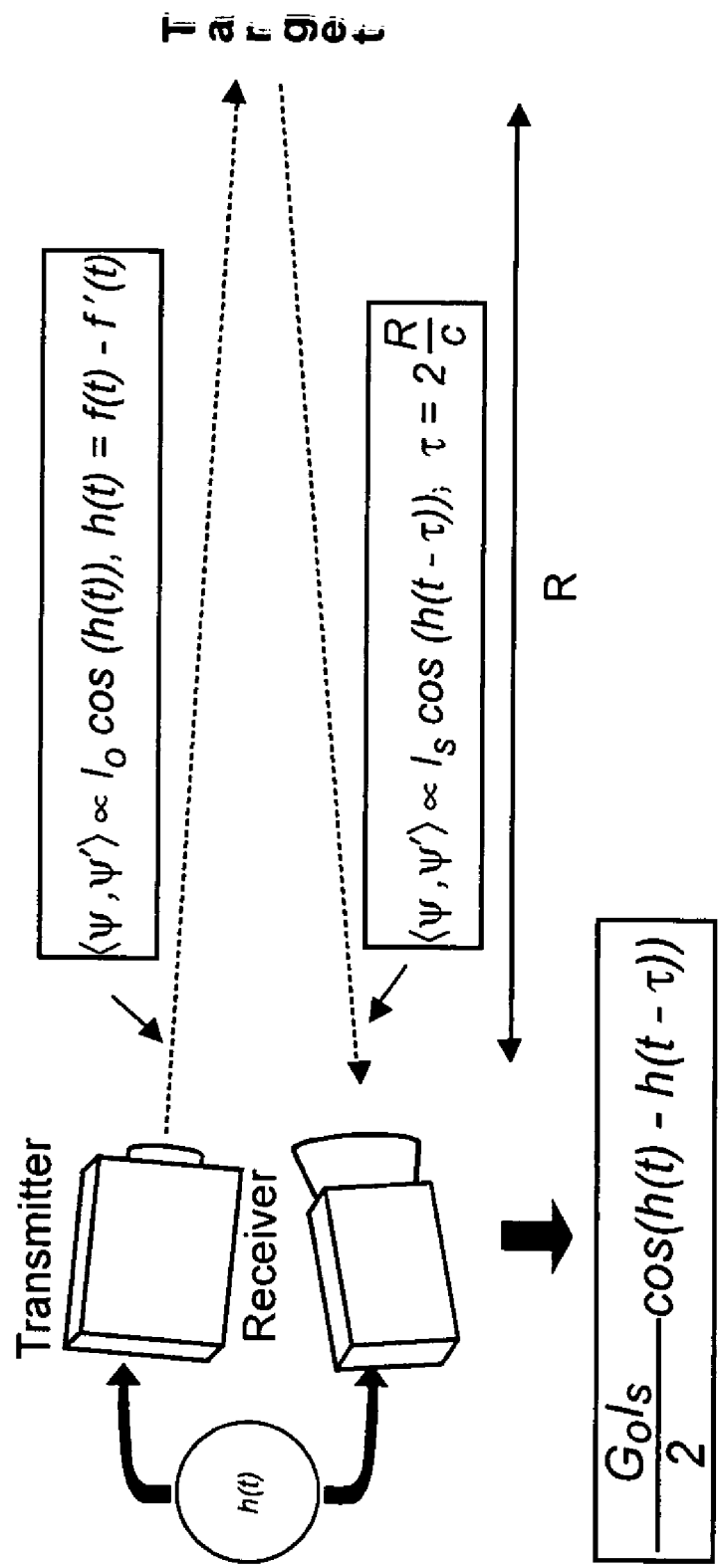
FIG. 15 illustrates the implementation of FIGS. 13 and 14 for building a phase or frequency interferometer suitable for Doppler and range resolved imaging.

FIG. 15 illustrates the elementary topology of a phase/frequency interferometer suitable for sampled array Doppler and range imaging algorithms. Simultaneous injection of exact copies of the function, h(t), into both transmitter modulator and receiver results in the interference signal $$\frac{G_o I_s}{2} \cos(h(t) - h(t-\tau)), \quad (21)$$

where $G_o$ is the total gain constant and $\tau=2R/c$ the round trip transit delay. An optimal h(t) is then employed given focal plane array sampling parameters and selected Doppler and range imaging algorithm. The following are two examples of Doppler and range imaging algorithms:

[1] Constant frequency, h(t)→2 $\pi f_o$t:

The time-shifted, target-reflected waveform is mixed with a fixed-frequency reference and down converted at the receiver while preserving phase and frequency shifts. A target's range is proportional to the measured phase shift, while a frequency shift corresponds to the target's velocity (Equations 19 and 20 respectively). Constant frequency is suitable for moving target imaging (MTI) and simple ranging.

[2] Linear frequency sweep (chirp), h(t)→$2\pi f_o t^2$:

The time-shifted, target-reflected waveform is mixed and down converted with the injected waveform at the receiver, producing a range-dependent beat frequency. Fourier transforming the swept interference signal generates the distributed range and Doppler information. Frequency chirping enables i) Range/Doppler invariant measurements, ii) range-resolved discrimination of weak reflected signals in the presence of much stronger near/far field reflections, and iii) range slicing through range-dependent frequency filtering, thus enabling the collection and integration of signal photons at a specified range.

Summarizing, the apparatus and methodology described enable the controlled generation and manipulation of hybrid fields for the efficient coherent detection of range, Doppler, and multi-channel imaging at mmRF through optical wavelengths by addressing the following problems: minimizing spatial mismatches between received and reference fields that result in low and unstable detection efficiencies and reduced detection coherence increases phase/amplitude distortion; reducing high-detection bandwidths caused by temporal mismatches between received and reference fields that effectively increases noise bandwidths and increases phase/amplitude distortion; reducing the short-wavelength effects of scattering from extended (rough) target surfaces that degrade detection via lowered coherent target cross-section and increased levels of scintillation/speckle; and, overcoming technology limitations, including the unavailability of very high frequency (>30 GHz) detectors, mixers, and amplifiers that can be integrated into compact imaging arrays.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for coherent hybrid electromagnetic field imaging of a target, comprising:
    a) a transmitter that comprises
        (i) an energy source to generate a propagating electromagnetic beam,
        (ii) means for splitting the propagating electromagnetic beam into two or more coherently matched beams of about equal amplitude wherein the spatial and temporal self-coherence between the coherently matched beams is preserved,
        (iii) means for differentially modulating the coherently matched beams with a first time-varying signal, the first time-varying signal chosen from a time-varying polarization signal, a time-varying frequency signal, a time-varying phase signal, a time-varying amplitude signal, or combinations thereof,
        (iv) means for coherently combining the two or more coherently matched, differentially modulated beams of (iii) into a coherent modulated electromagnetic beam,
        (v) controlling means for collimating, guiding, or focusing the coherent modulated electromagnetic beam of (iv), and
        (vi) one or more apertures for transmitting the coherent electromagnetic beam of (v) to the target,
    (b) a receiver capable of square-law detection of the coherent electromagnetic beam received from the target, the receiver comprising
        (i) one or more apertures for receiving the coherent electromagnetic beam from the target,
        (ii) controlling means for collimating, guiding, or focusing the electromagnetic beam received from the one or more apertures of (b, i),
        (iii) a square law detector for extracting the first time-varying signal from the electromagnetic beam received from the controlling means of (b, ii),
    (c) a waveform generator that (i) generates the first time-varying signal of (a, iii) used to modulate the two or more coherently matched beams, and (ii) generates a second time-varying signal that is keyed and synchronized to the first time-varying signal, the second time-varying signal being used to demodulate a square law detected signal from the receiver, and
    (d) means for displaying images of the target from the demodulated square law detected signal from the receiver.

2. The apparatus of claim 1, where said energy source is selected from the group consisting of: lasers, masers, light emitting diodes, lamps, and RF generators.

3. The apparatus of claim 1, where said means for splitting the propagating electromagnetic beam is selected from the group consisting of: free-space beam splitters, n-port fiber-optic splitters, integrated waveguides, coaxial cable splitters, waveguide splitters, and tees.

4. The apparatus of claim 1, where said means for differentially modulating the coherently matched beams is selected from the group consisting of: electro-optic phase modulators, acousto-optic frequency modulators, liquid crystal phase and polarization modulators, and amplitude modulated sources.

5. The apparatus of claim 1, where said controlling means for collimating, guiding, or focusing the coherent modulated electromagnetic beam are selected from the group consisting of lenses, waveguides, reflectors, mirrors, and fiber optics.

6. The apparatus of claim 1, where said one or more apertures are selected from the group consisting of a lens, antennae, fiber optic, waveguide, or telescope.

7. The apparatus of claim 1, where said square law detector is selected from the group consisting of imaging focal plane arrays and single element detectors.

8. The apparatus of claim 7, where said imaging focal plane arrays are selected from the group consisting of avalanche photodiodes, multi-quantum well photodetectors, and extrinsic semiconductor blocked impurity band devices.

9. The apparatus of claim 7, where said single element detector is selected from the group consisting of conventional photodiode, photo resistive, photoconductive, charge couple device, bolometer, and photoemission.

10. The apparatus of claim 1, further including a pixel level multiplying gain means selected from the group consisting of multi-channel plate or image intensified tube, avalanche photodiodes, multi-quantum well photodetectors, and extrinsic semiconductor blocked impurity band devices.

11. The apparatus of claim 1, where said means of displaying images is selected from the group consisting of film and electronic video display.

12. A method for coherent hybrid electromagnetic field imaging, comprising:
   a. generating a propagating electromagnetic beam with an energy source,
   b. splitting said propagating electromagnetic beam into two or more coherently matched beams of about equal amplitude, where the spatial and temporal self-coherence between each two or more coherently matched beams is preserved,
   c. modulating the two or more coherently matched beams with a first time-varying signal;
   d. combining the two of more coherently matched beams into a coherent electromagnetic beam;
   e. transmitting the coherent electromagnetic beam to a target,
   f. receiving the coherent electromagnetic beam from the target,
   g. square-law detecting the coherent electromagnetic beam,
   h. demodulating square law detected signal; and
   i. displaying an image of the target using the demodulated square law detected signal.

* * * * *